United States Patent

Northrup

[15] 3,691,206
[45] Sept. 12, 1972

[54] PRIMER FOR CURED SILICONE RELEASE AGENTS

[72] Inventor: Hal J. Northrup, c/o Dow Corning Corp., Midland, Mich. 48640

[22] Filed: March 29, 1971

[21] Appl. No.: 129,214

Related U.S. Application Data

[60] Continuation of Ser. No. 739,967, May 22, 1968, which is a division of Ser. No. 491,414, Sept. 29, 1965, Pat. No. 3,427,270.

[52] U.S. Cl........260/348 SC, 260/29.1, 260/46.5 Y, 260/448.2, 260/448.2 B, 260/448.2 Q, 260/824 EP, 260/825

[51] Int. Cl. ..........................C08g 31/32, C07f 7/18

[58] Field of Search.......260/348 SC, 448.2, 448.2 B, 260/448.2 Q

[56] References Cited

UNITED STATES PATENTS

| | | |
|---|---|---|
| 2,643,964 | 6/1953 | Smith-Johannsen..........161/93 |
| 2,866,800 | 12/1958 | MacKenzie et al.....260/448.8 |
| 2,946,701 | 7/1960 | Plueddemann........260/348 X |
| 3,076,726 | 2/1963 | Ault et al..................117/155 |
| 3,120,546 | 2/1964 | Plueddemann............260/348 |
| 3,264,258 | 8/1966 | Ceyzeriat..................260/46.5 |

Primary Examiner—Norma S. Milestone
Attorney—Robert F. Fleming, Jr., Laurence R. Hobey and Harry D. Dingman

[57] ABSTRACT

A composition useful as a coupling agent for promoting the adhesion of a cured organopolysiloxane release agent to a cellulosic substrate is the reaction product of

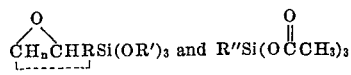

where R is a divalent or trivalent radical of carbon and hydrogen, R' is a lower alkyl, $n$ is 1 to 2 and R" is a monovalent hydrocarbon radical. An example is a reaction product of

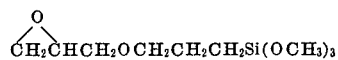

and vinyltriacetoxysilane.

5 Claims, No Drawings

PRIMER FOR CURED SILICONE RELEASE AGENTS

This is a continuation of application Ser. No. 739,967, filed May 22, 1968, which is a division of application Ser. No. 491,414, filed Sept. 29, 1965, now U.S. Pat. No. 3,427,270, issued Feb. 11, 1969.

This application relates to new adhesion promoters for cured organopolysiloxane release agents on cellulosic substrates.

Cured organopolysiloxane release agents are commercially used on various types of paper and cardboard. An example of such a release agent is a hydroxyl-endblocked dimethylpolysiloxane gum crosslinked with a small amount of methylhydrogenpolysiloxane after application to a cellulosic substrate as shown in U.S. Pat. No. 3,061,567. Examples of other silicone release agents are shown in U.S. Application Ser. No. 477,304, filed Aug. 4, 1965, now U.S. Pat. No. 3,445,417 issued May 20, 1969.

The organopolysiloxane release agents have, however, a tendency of being removable from their substrates by abrasion due to a weak bond between the release agent and substrate. A number of primers have been developed to improve the adhesion of the release agents to their substrates, including the epoxyacyloxysilanes of U.S. Pat. No. 3,120,546.

This application relates to a coupling agent for promoting the adhesion of a cured organopolysiloxane release agent to a cellulosic substrate consisting essentially of the reaction product of from 25 to 75 weight per cent of a. a silane of the formula

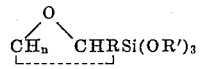

and from 25 to 75 weight per cent of b. a silane of the formula

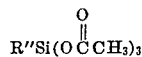

where

R is a divalent or trivalent radical consisting of carbon and hydrogen, any other atoms present being oxygen in an ether or carboxylic ester linkage, R' is a lower alkyl radical, $n$ has a value of 1 to 2, and R'' is a monovalent hydrocarbon radical of no more than 3 carbon atoms, R being trivalent when $n$ has a value of 1 and divalent when $n$ has a value of 2.

The coupling agents of this invention exhibit superiority over the previously known primers in that they provide firm coupling of the silicone release agent to its cellulosic substrate without significantly altering the release properties of the agent, and, additionally, the primer can be added to a solvent solution of the silicone release agent to provide one-step application of primer and release agent, while lengthening the time which elapses before gelation of the release agent occurs in the bath. The previously-known primers fail to consistently yield all of the above advantages, as compared with the primers of this invention.

R can be any radical as defined above, e.g. methylene, ethylene, propylene, butylene, decylene, phenylene, xenylene, cyclohexylene, cyclopentylene, methylcyclohexylene, tolylene and $-CH_2CH=CH-CH_2-$. R can also be any divalent ether radical such as $-CH_2CH_2OCH_2CH_2-$,

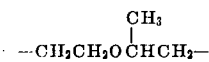

$-CH_2(OC_2H_4)_4O(CH_2)_3-$, $-CH_2OC_2H_4OC_2H_4-$ and $-CH_2OCH_2CH=CH_2-$. R can also contain a divalent ester linkage derived from a carboxylic acid such as $-CH_2OOCCH_2CH_2-$, $-CH_2OOC(CH_2)_6-$,

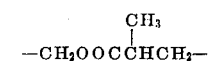

and $-CH_2(OC_3H_6)_2OOCCH_2CH_2-$.

R' can be any lower alkyl radical such as methyl, ethyl, isopropyl, or butyl.

Ingredient (a), therefore, can be any silane such as

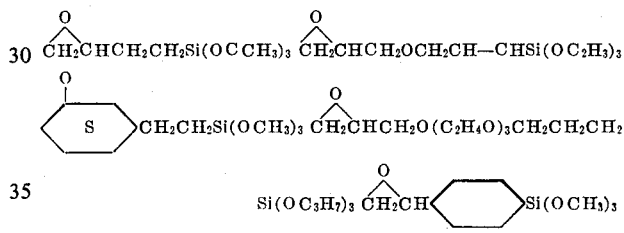

and

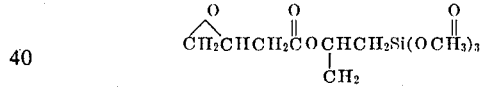

Examples of ingredient (b) are

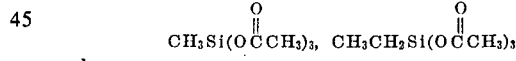

and

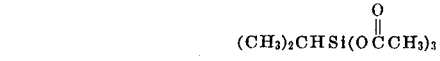

Ingredients (a) and (b) spontaneously react with each other to form the reaction product of this invention. The reaction takes about 20 days at room temperature, about 2 hours at 150°C., and about 1 hour at 200°C. An unreacted mixture of (a) and (b) does not yield the above-mentioned advantages to the same degree as does their reaction product. The presence of the reaction product can therefore be ascertained by observing a marked improvement in the properties of the composition as a primer for a release agent over a mixture of the separate ingredients.

It should be noted that ingredient (b) is operative alone as a primer for release agents, but several times the amount of (b) alone is required to duplicate the adhesion provided by a given amount of the reaction product of (a) and (b). Furthermore, ingredient (b) alone has a tendency of shortening the gel time of a solution of silicone release agent.

Ingredient (a) alone imparts only a minor improvement in the adhesion of silicone release agents to cellulosic substrates.

The epoxyacyloxysilanes mentioned above give irreproducible and varying results as primers for silicone release agents.

The exact chemical nature of the reaction product of this invention is unknown. It has been observed, however, that most of the epoxy groups of ingredient (a) disappear on formation of the reaction product, while a majority of the acetoxy groups of ingredient (b) are retained. The reaction product would therefore appear to contain some sort of an organic polymer with silyl pendant groups.

A preferred ingredient (a) is a silane of the formula

The coupling agents of this invention are generally added to the organopolysiloxane release agent, which is usually dispersed in a volatile solvent such as xylene, perchloroethylene, benzene, octane, cyclohexane, dibutylketone, or dibutylether. This solution, which may also contain a suitable known curing catalyst for the organopolysiloxane release agent, is then applied to the cellulosic substrate and cured after the solvent has evaporated. Examples of suitable curing catalysts are stannous octoate, dibutyltin dilaurate, and tetrabutyl titanate.

Generally, no modifications of the normal techniques for the application and curing of silicone release agents are required when the coupling agents of this invention are used.

A desirable bath for coating a cellulose substrate with a silicone release agent and the coupling agent of this invention consists essentially of (1) 100 parts by weight of a curable organopolysiloxane release agent, (2) from 0.5 to 10 parts by weight of the reaction product of from 25 to 75 weight per cent of a silane of the formula

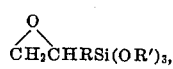

and from 25 to 75 weight per cent of (b) a silane of the formula $$R''Si(O\overset{O}{\overset{\|}{C}}CH_3)_3$$

where R is a divalent or trivalent radical consisting of carbon and hydrogen, any other atoms present being oxygen in an ether or carboxylic ester linkage. R' is a lower alkyl radical, $n$ has a value of 1 to 2, and R'' is a monovalent hydrocarbon radical of no more than 3 atoms, R being trivalent when $n$ has a value of 1 and divalent when $n$ has a value of 2, and (3) from 50 to 20,000 parts by weight of a volatile solvent for (1).

The following examples are illustrative only and should not be construed as limiting the invention, which is properly delineated in the appended claims.

EXAMPLE 1

To several samples consisting of about 29 parts by weight of a hydroxyl-endblocked dimethylpolysiloxane having a viscosity at 25°C. of about 8,000 cs., 1 part of a composition of the formula

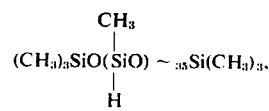

270 parts of xylene, and a small amount of dibutyltin dilaurate as a curing catalyst, there was added a coupling agent of the type and amount shown below.

The resulting solution was coated on glassine paper with a No. 14 Mayer rod, and cured for 2 minutes at 250°F.

The product was a paper which was coated with a thin film of cured, elastomeric silicone which exhibited excellent release properties. This silicone film was vigorously rubbed with the finger to see whether it would rub off of the paper. The results were as follows:

| Coupling Agent | | Rub-off |
|---|---|---|
| (a) | 0.75 part each of vinyltriacetoxysilane and $\overset{O}{\overset{\diagup\diagdown}{CH_2CHCH_2O(CH_2)_3Si(OCH_3)_3}}$ previously heated together for 16 hours at 250°F. | none |
| (b) | 0.75 part each of ethyltriacetoxysilane and $\overset{O}{\overset{\diagup\diagdown}{CH_2CHCH_2O(CH_2)_3Si(OCH_3)_3}}$ previously heated together for 16 hours at 250°F. | none |
| (c) | 0.75 part each of methyltriacetoxysilane and $\overset{O}{\overset{\diagup\diagdown}{CH_2CHCH_2O(CH_2)_3Si(OCH_3)_3}}$ previously heated together for 16 hours at 250°F. | none |
| (d) | 0.14 part of vinyltriacetoxysilane and 0.40 part of $\overset{O}{\overset{\diagup\diagdown}{CH_2CHCH_2O(CH_2)_3Si(OCH_3)_3}}$ heated 4 hours at 175°F. and 1 hour at 250°F. | none |
| (e) | 0.40 part of vinyltriacetoxysilane and 0.14 part of $\overset{O}{\overset{\diagup\diagdown}{CH_2CHCH_2O(CH_2)_3Si(OCH_3)_3}}$ heated 4 hours at 175°F. and 1 hour at 250°F. | none |
| (f) | similar to (a), but without prior heating | very slight |
| (g) | 0.75 part of methyltriacetoxysilane | slight |
| (h) | 0.75 part of $\overset{O}{\overset{\diagup\diagdown}{CH_2CHCH_2O(CH_2)_3Si(OCH_3)_3}}$ | |

Runs (f) through (h) are included to show the superiority of the coupling agents of this invention (runs (a) through (e)).

The remaining portions of the solutions used in runs (d) and (e) above were allowed to stand at room temperature for 96 hours. They were still both ungelled and useable at the end of this period.

Identical solutions which contained no coupling agent, or which contained only an organotriacetoxysilane coupling agent gelled in 6 to 24 hours at room temperature.

EXAMPLE 2

When the following amounts of the following coupling agents are added to mixtures of 100 g. of

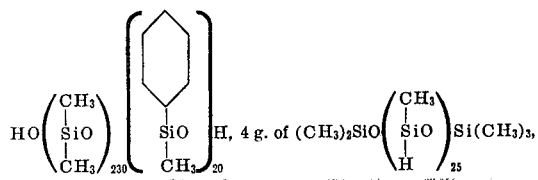

1 g. of dibutyltin diacetate as a curing catalyst, and 200 g. of 1,1,1-trichloroethylene, solutions are formed which, when coated on paper and cured at 300°F. for 2 minutes, impart flexible coatings to the paper which are nonadherent to synthetic, nonsilicone adhesives, yet which have excellent adhesion to the paper:

| Amount | Coupling Agent |
|---|---|
| (a) 1 g. | Equal wts. of isopropyltriacetoxysilane and 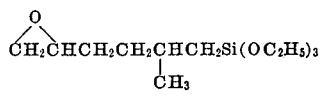 heated for 2 hours at 400°F. |
| (b) 7 g. | 4 g. of n-propyltriacetoxysilane and 3 g. of 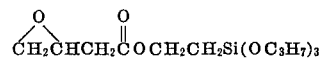 heated for 1 hour at 500°F. |
| (c) 3 g. | Equal wts. of ethynyltriacetoxysilane and 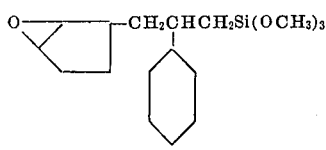 heated for 24 hours at 150°F. |

That which is claimed is:

1. A coupling agent for promoting the adhesion of a cured organopolysiloxane release agent to paper and cardboard consisting essentially of the reaction product obtained after from 20 days at room temperature to 1 hour at 260°C. of from 25 to 75 weight per cent of
   a. a silane of the formula

and from 25 to 75 weight per cent of
   b. a silane of the formula

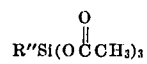

where R is a divalent radical selected from the group consisting of methylene, ethylene, propylene, butylene, decylene, phenylene, xenylene, cyclohexylene, cyclopentylene, methylcyclohexylene, tolylene, —$CH_2CH=CHCH_2$—, —$CH_2CH_2OCH_2CH_2$—, $$-CH_2CH_2O\overset{CH_3}{\underset{|}{C}}HCH_2-$$

—$CH_2(OC_2H_4)_4O(CH_2)_3$—, —$CH_2OC_2H_4OC_2H_4$—, —$CH_2OCH_2CH=CH$—, —$CH_2OOCCH_2CH_2$—, —$CH_2OOC(CH_2)_6$—,

—$CH_2(OC_3H_6)_2OOCCH_2CH_2$—, —$CH_2O(C_2H_4O)_3CH_2CH_2CH_2$—,

—$CH_2OCH_2CH_2CH_2$,

and —$CH_2COOCH_2CH_2$—,
   R' is a lower alkyl radical and
   R'' is a monovalent hydrocarbon radical of no more than three carbon atoms selected from the group consisting of methyl, ethyl, isopropyl, n-propyl, vinyl and ethynyl.

2. The coupling agent of claim 1 where (a) is

3. The coupling agent of claim 2 where (b) is vinyltriacetoxysilane.

4. The coupling agent of claim 2 where (b) is methyltriacetoxysilane.

5. The coupling agent of claim 2 where (b) is ethyltriacetoxysilane.

* * * * *